(12) United States Patent
Rouphael

(10) Patent No.: US 7,349,489 B2
(45) Date of Patent: Mar. 25, 2008

(54) PULSE SHAPING FILTER WITH MINIMAL INTERSYMBOL INTERFERENCE

(75) Inventor: Antoine J. Rouphael, Escondido, CA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 631 days.

(21) Appl. No.: 09/929,716

(22) Filed: Aug. 13, 2001

(65) Prior Publication Data

US 2003/0031280 A1 Feb. 13, 2003

(51) Int. Cl.
H04L 25/03 (2006.01)
(52) U.S. Cl. ...................... 375/296; 375/229
(58) Field of Classification Search ............... 375/346, 375/229–236, 295–296
See application file for complete search history.

(56) References Cited

U.S. PATENT DOCUMENTS

| | | | |
|---|---|---|---|
| 5,027,369 A * | 6/1991 | Kuenast ...................... 375/233 |
| 5,068,874 A | 11/1991 | Leitch ......................... 375/51 |
| 5,386,202 A | 1/1995 | Cochran et al. ............. 332/100 |
| 5,774,505 A | 6/1998 | Baugh ......................... 375/348 |
| 5,881,109 A | 3/1999 | Kim et al. ................... 375/298 |
| 5,912,920 A * | 6/1999 | Marchok et al. ............ 375/219 |
| 5,933,467 A * | 8/1999 | Sehier et al. ................ 375/350 |
| 5,970,093 A * | 10/1999 | de Lantremange .......... 375/234 |
| 6,072,340 A | 6/2000 | Deisch ........................ 327/100 |
| 6,516,025 B1 * | 2/2003 | Warke et al. ................ 375/222 |
| 6,647,069 B1 * | 11/2003 | Segal et al. ................. 375/278 |
| 6,862,326 B1 * | 3/2005 | Eran et al. ................... 375/343 |
| 2003/0035495 A1 * | 2/2003 | Laamanen et al. .......... 375/296 |
| 2003/0091111 A1 * | 5/2003 | Vaananen .................... 375/231 |

* cited by examiner

Primary Examiner—Chieh M. Fan
Assistant Examiner—Freshteh N Aghdam
(74) Attorney, Agent, or Firm—Laurence A. Greenberg; Werner H. Stemer; Ralph E. Locher

(57) ABSTRACT

An improved shaping filter (R) is provided in a radio frequency communication system. The filter response of the shaping filter (R) is generated by constraining the filter coefficients in their adaptation at the optimal sampling point and not constraining them at the non-sampling points. That is, the error metric is updated only at the optimum sampling point.

8 Claims, 4 Drawing Sheets

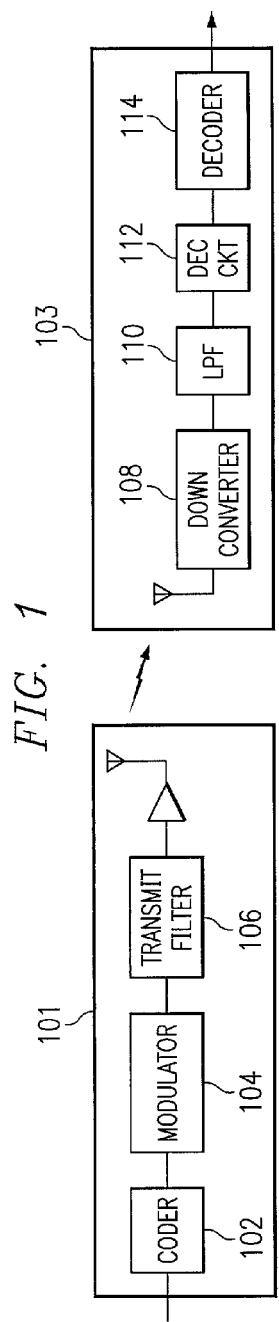
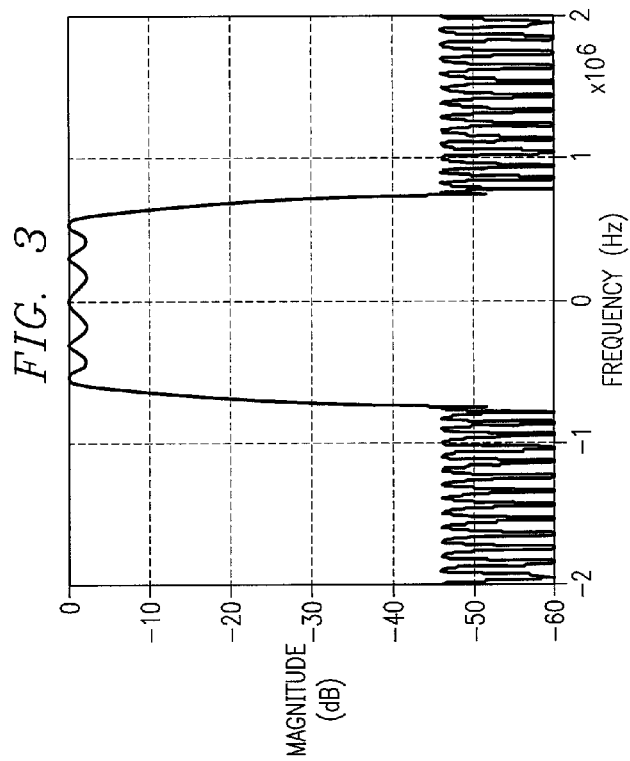
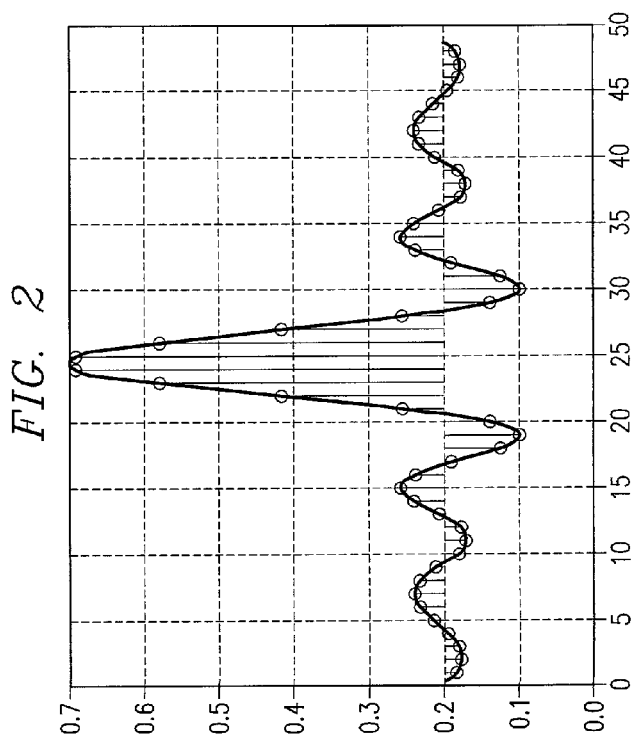

PULSE SHAPING FILTER WITH MINIMAL INTERSYMBOL INTERFERENCE

BACKGROUND OF THE INVENTION

1. Field of the Invention

The present invention relates to communication systems and, in particular, to an improved pulse shaping filter.

2. Description of the Related Art

In digital communication systems, data symbols are typically made up of a series of square pulses, in which each pulse is transmitted at an amplitude of one of at least two binary states. The pulses are generally shaped to bandlimit the transmitted signal.

The Nyquist class of pulse shapes exhibit an amplitude of zero at a set of equally spaced time instants and minimize the spectrum required to transmit signals. By precise positioning of the zero points, intersymbol interference (ISI) and the performance degradation associated therewith may be avoided. While Nyquist pulses offer spectral efficiency, overall performance is highly sensitive to pulse shape. Deviation from the Nyquist shape can introduce severe performance degradation.

For example, RF anomalies such as those resulting from SAW and ceramic filters and other anomalies across the desired band are typically not taken into account when pulse shaping. As such, even though the pulses may be nominally "Nyquist pulses," in practice, severe intersymbol interference may be introduced by the pulse shaping filter. One such filter is the pulse shaping filter used in the user and base station of an IS-95 CDMA (TIA/EIA Interim Standard 95 for Code Division Multiple Access) cellular telephone system Similarly, the IS-136 TDMA (TIA/EIA Interim Standard 136 for Time Division Multiple Access) standard employs a square root raised cosine filter to minimize ISI at the optimal sampling point, with pulse shaping at both the transmit and receive ends. The IS-95 and IS-136 standards are incorporated herein by reference in their entireties as if fully set forth herein.

In neither system, however, do the shaping filters take into account the radio frequency (RF) anomalies introduced into the system. For example, the IS-136 filter(s) are matched only to the digital portion of the receiver and do not take into account distortion introduced by the RF and intermediate frequency (IF) components. As such, there is a need for an improved shaping filter that takes into account RF and IF interference.

SUMMARY OF THE INVENTION

These and other drawbacks in the prior art are overcome in large part by a system and method according to embodiments of the present invention. An improved shaping filter according to an embodiment of the present invention is provided in a communication system. The filter response of the shaping filter is generated by constraining the filter coefficients in their adaptation at the optimal sampling point and not constraining them at the non-sampling points. That is, the error metric is updated only at the optimum sampling point.

A method according to an embodiment of the present invention includes specifying an initial shaping filter, determining intersymbol interference for that filter, and iteratively updating filter coefficients at the sampling period until the intersymbol interference is at or below a desired threshold.

A telecommunications device according to an implementation of the invention includes a transmitter and receiver. Either or both the transmitter and receiver may include pulse shaping according to embodiments of the present invention.

BRIEF DESCRIPTION OF THE DRAWINGS

A better understanding of the invention is obtained when the following detailed description is considered in conjunction with the following drawings in which:

FIG. 1 is a diagram of a telecommunications device in accordance with an implementation of the invention;

FIG. 2 is a diagram of an exemplary 48 tap transmit filter as specified in the IS-95 standard;

FIG. 3 illustrates the frequency domain representation of the filter of FIG. 2;

DETAILED DESCRIPTION OF THE INVENTION

Figure 4:
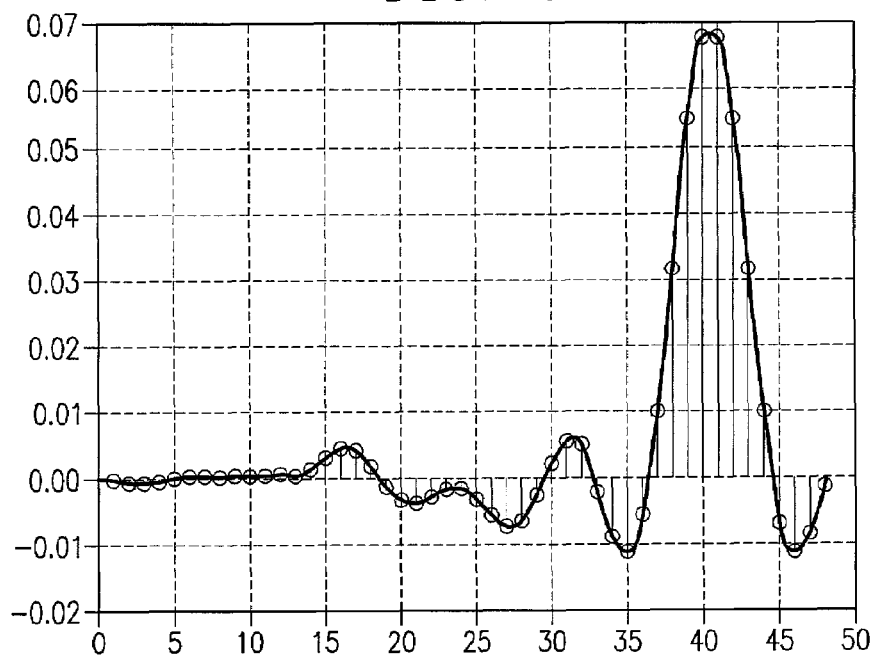
FIG. 4 illustrates a matched filter W according to an implementation of the invention.
Figure 5:
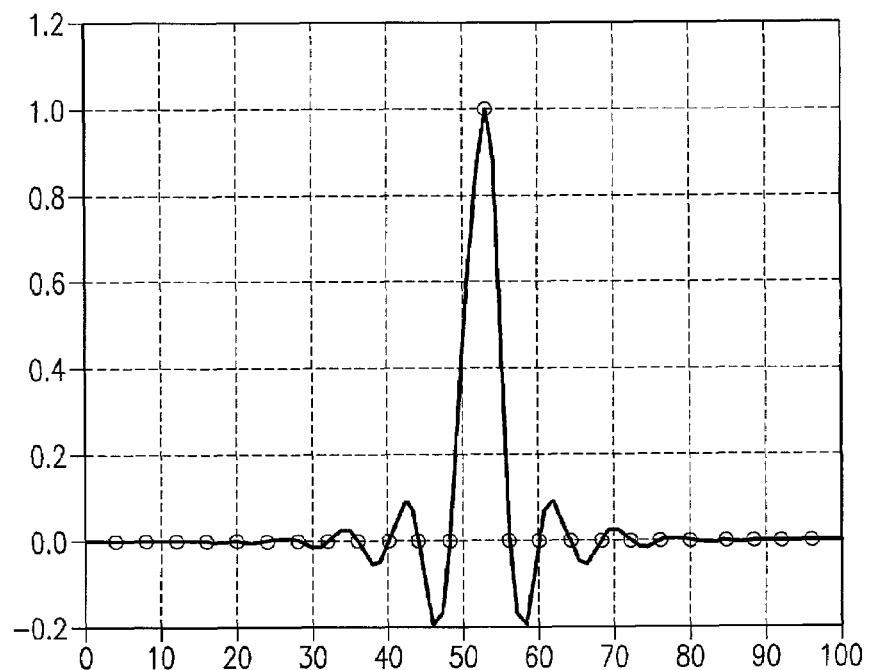
FIG. 5 illustrates an exemplary shaping filter R derived according to an embodiment of the invention.

FIGS. 1-8 illustrate a system and method for pulse shaping with minimal intersymbol interference. Shown in FIG. 1 is an exemplary telecommunications transmitter 101 and receiver 103 adapted to use a shaping filter and method according to embodiments of the present invention. The transmitter 101 and receiver 103 may be exemplary of, for example, a basic RF digital communications device. In a system, the transmitter 101 and receiver 103 would be among a plurality of similar devices, including mobile units and base stations.

The transmitter 101 and receiver 103 respectively transmit and receive data over a transmission medium, such as air, cable, optical fiber, etc. The transmitter 101 receives an input data stream at a coder 102 which converts the stream into a set of symbols. The signal is modulated at modulator 104. The symbols are then provided to a transmit filter 106 which may include pulse shaping according to the present invention, as will be explained in greater detail below. Finally, the signal is then sent over the channel or transmission medium. In one implementation, the transmission medium is free space.

The receiver 103 may represent a conventional demodulator. The receiver 103 includes a down converter 108 that receives the modulated carrier from the transmitter 101 and translates the signal to baseband. The signal is routed to a lowpass filter 110 to reduce noise. A decision circuit 112 then receives the lowpass filter output. The decision circuit 112 may employ, for example, a maximum likelihood or other decision statistic to determine which of a number of predetermined discrete targets the receive signal most closely resembles. A decoder 114 then decodes the output of the decision circuit 112.

As noted above, a transmit filter 106 according to an implementation of the invention substantially reduces intersymbol interference. The generation of the filter coefficients occurs during calibration, for example, at the factory. The filter response is generated by constraining the coefficients in their adaptation at the optimal sampling point and unconstraining them elsewhere. That is, the error metric is updated only at the optimum sampling point rather than at every sample.

Derivation of a filter according to an embodiment of the present invention is illustrated by way of example. In particular, FIG. 2 illustrates an exemplary filter with predetermined spectral characteristics. In particular, the filter of FIG. 2 is a 48-tap transmit shaping filter such as specified in IS-95. FIG. 3 illustrates in frequency domain the filter of FIG. 2. As shown, the filter of FIG. 2 has a passband frequency set at $f_p$=590 kHz with a passband ripple of about +/−1.5 dB. The stopband frequency is set at $f_s$=740 kHz with bandreject ripple of about 40 dB.

Figure 6A:
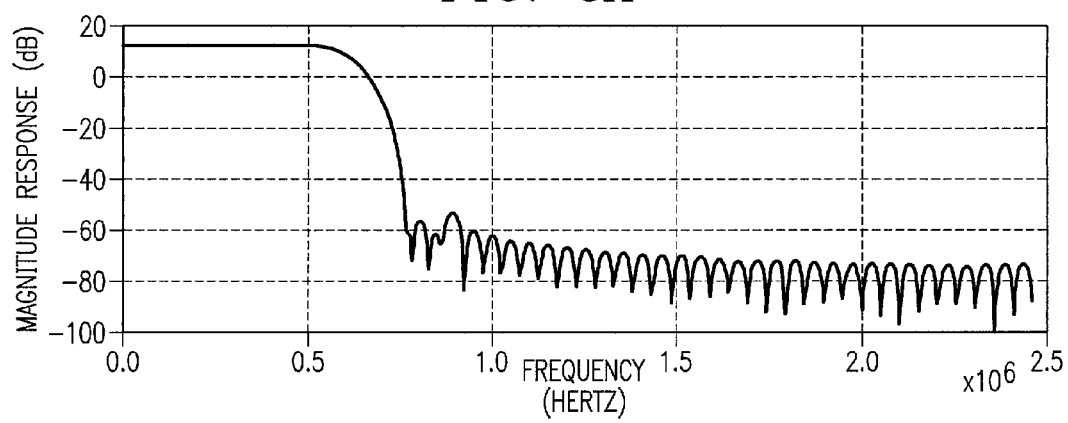
FIG. 6A and FIG. 6B are frequency response amplitude and phase diagrams of the filter of FIG. 5.
Figure 6B:
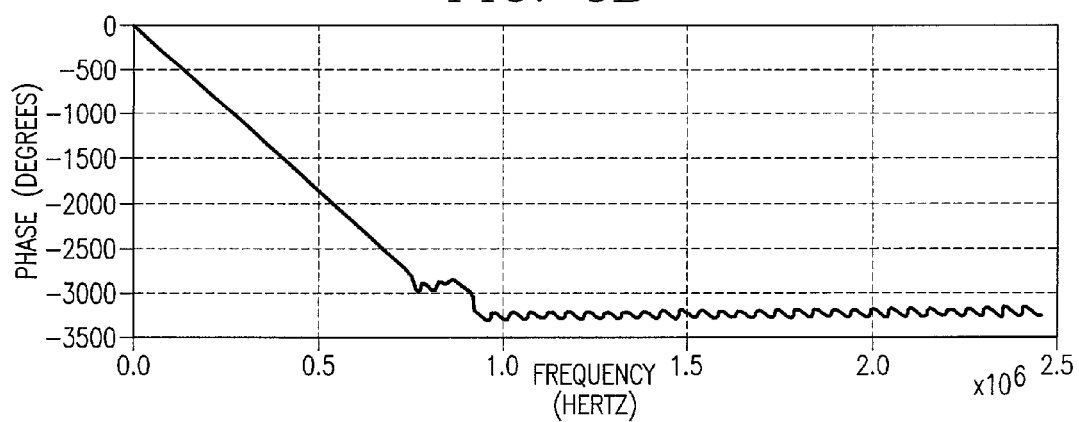

As noted above, use of such a transmit filter can induce intersymbol interference due to RF anomalies. Thus, according to an implementation of the present invention, a matched filter W(n) such as that shown in FIG. 4 is generated and used to derive an overall shaping filter shown in FIG. 5. The filter of FIG. 5 has a frequency response as shown in FIG. 6A and FIG. 6B. As can be seen, the frequency response of the filter of FIG. 5 has minimal lobes beyond the main lobe and a linear phase in the region of interest.

Figure 7:
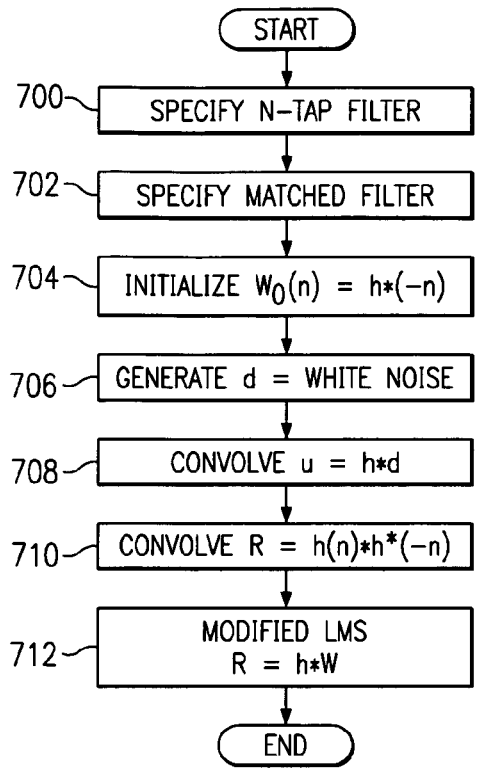
FIG. 7 is a flowchart illustrating operation of an implementation of the invention.

Generation of filter coefficients for the filter of FIG. 4 is described below by way of example, in FIG. 7, using a modified Least Mean Square (LMS) method. It is noted, however, that the method of the present invention is applicable using other adaptive methods, such as recursive least squares, and the like.

In a step 700, an initial N-tap filter, h(n), with given spectral characteristics is specified. One such filter may be the 48 tap filter shown in FIG. 2. In 702, the matched filter h*(−n) of h(n) is specified. The h*(−n) is the set of filter coefficients to be adapted. In step 704, the initial set of coefficients of the matched filter is set as W0(n)=h*(−n). In 706, a digital data sequence, such as a white noise sequence, d is generated. The digital data sequence may be any suitable data sequence and is used to model the channel noise and ISI induced thereby. In 708, the convolution of d and h, u=conv (d,h), is obtained.

Figure 8:
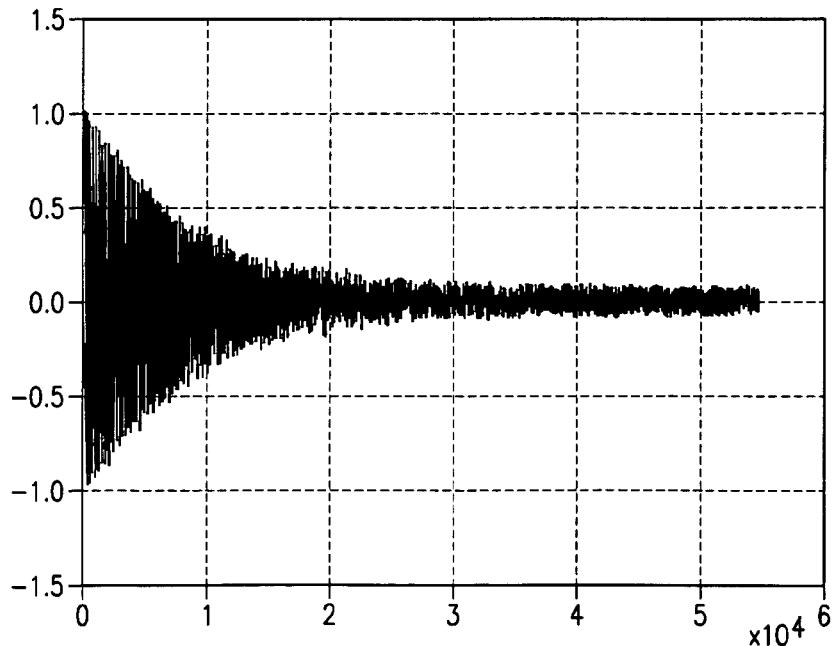
FIG. 8 illustrates convergence of an error term using a method in accordance with an embodiment of the invention.

An initial shaping filter R0 is obtained in 710 by performing the convolution, R, of h(n) and h*(−n), where h*(−n)=W0(n) is an initial matched filter. Then, the frequency response of R is the product of the frequency responses of h(n) and h*(−n). In 712, the coefficients are adapted via the modified LMS algorithm below:

DO WHILE (overall ISI of R>desired ISI)
    For n=L+1:L:N; where L is the sampling period, N is the number of coefficients.
    $e(n)=d(n)-W(n-L)u(n-L:n-L-1+M)^T$; where e(n) is the error, W(n) are the filter coefficients, and u(n) is as above.
    W(n+L)=W(n)−μe(n)u(n−L:n−L−1+M), where p is an adaptation factor.
    END
    R=conv(h,W).
END The desired ISI may be an arbitrary level set to ensure desired performance. The method then derives a shaping filter R such that the resulting ISI is less than or equal to that desired level. The loop index provides that the shaping of the filter occurs only at the optimum sampling points, i.e., the upsampling period. The error term is the difference between the noise (i.e., channel noise) and channel response as shaped by the shaping filter. The error term e(n) converges to a minimum level, as shown in FIG. 8. In other embodiments, the error value may be an arbitrarily chosen minimum or threshold. The filter coefficients are then updated with a scaled version of the previous value.

The invention described in the above detailed description is not intended to be limited to the specific form set forth herein, but is intended to cover such alternatives, modifications and equivalents as can reasonably be included within the spirit and scope of the appended claims.

What is claimed is:

1. A method for reducing intersymbol interference in a telecommunications system, comprising:

specifying an initial shaping filter, said initial shaping filter being specified by performing a convolution on a signal associated with a given filter, having certain spectral and time domain characteristics, with a signal associated with a matched complex counterpart of said given filter, determining a level of intersymbol interference of a final shaping filter where said final shaping filter is obtained by processing signals associated with said initial shaping filter, said determining including generating a white noise data sequence and using said white noise data sequence in a model of channel noise and intersymbol interference;

updating final shaping filter coefficients at optimal sampling pints other than every sample iteratively until the intersymbol interference is at or below a desired level, said optimal sampling points being at a sampling period; and configuring a transmit filter of a radio frequency communications system with said final shaping filter coefficients.

2. A method, comprising:

specifying a given filter with certain time domain and spectral characteristics, obtaining a matched filter counterpart of said given filter;

performing a convolution between a signal associated with said given filter and a signal associated with said matched filter to obtain an initial shaping filter;

generating a noise data sequence, said data sequence comprising a channel noise and intersymbol interference model;

convolving said data sequence with said signal associated with said given filter; and deriving a specification of an optimized shaping filter responsive to said convolving by adaptively minimizing an error metric at points on said initial shaping filter corresponding to optimal sampling points other than every sample thus producing a signal with minimal ISI period; and configuring a transmit filter of a radio frequency communications system with coefficients associated with said optimized shaping filter.

3. A method in accordance with claim 2, said error metric comprising a least mean squares error metric.

4. A telecommunications device, comprising:

a coder adapted to encode data; an RF modulator; and a shaping filter adapted to shape said encoded data, the shaping filter specified by constraining filter coefficients in their adaptation at optimal sampling points and not constraining said filter coefficients at points other than optimal sampling points, an initial shaping filter comprising a channel noise filter and intersymbol interference shaping filter, said intersymbol interference shaping filter adapted to minimize intersymbol interference, said initial shaping filter based upon a convolution between a signal associated with said shaping filter and a corresponding signal associated with a matched filter of said shaping filter.

5. A telecommunications device as recited in claim 4, wherein said constraining is iteratively performed until an error metric reaches a steady state minimum level.

6. A telecommunications device as recited in claim 4, wherein said constraining is iteratively performed until an error metric reaches a predetermined threshold level.

7. A method, comprising:
specifying an initial filter; first convolving a signal associated with said initial filter with a corresponding signal associated with a matched filter of said initial filter to obtain a specification of an initial shaping filter; second convolving said signal associated with said initial filter with a noise data sequence, said noise data sequence comprising a channel noise and intersymbol interference model; deriving, responsive to said first convolving and second convolving, a specification of a shaping filter by minimizing an error metric at points on said signal associated with said initial filter corresponding to an upsampling period, the upsampling period comprising optimal sampling points other than every sampling point; and configuring a transmit filter of a radio frequency communications system with coefficients based upon said specification of said shaping filter.

8. A method as recited in claim 7, wherein said deriving comprises constraining filter coefficients in their adaptation at optimal sampling points and not constraining them at non-sampling points.

* * * * *